Patented Aug. 28, 1951

2,565,488

UNITED STATES PATENT OFFICE 2,565,488

SECONDARY 1,3-ALKENEDIAMINES

Harry de V. Finch, El Cerrito, and Elbert A. Peterson, Berkeley, Calif., assignors to Shell Development Company, San Francisco, Calif., a corporation of Delaware No Drawing. Application July 7, 1947, Serial No. 759,474

7 Claims. (Cl. 260—583)

This invention relates to new and useful chemical compounds and to a method for their preparation. More particularly, the present invention relates to new and useful unsaturated diamines, and to a method for their preparation from the alpha,beta-olefinic aldehydes by a process comprising the step of interacting an alpha,beta-olefinic aldehyde and a suitable normally liquid-to-solid primary aliphatic amine.

An object of the invention is the preparation and the provision of new and useful chemical compounds. A more particular object of the invention is the preparation and the provision of new and useful unsaturated diamines wherein the nitrogen atoms are secondary amino nitrogen atoms and the terminal groups bonded to the nitrogen atoms are aliphatic hydrocarbon groups containing at least three carbon atoms. A further object of the invention is a method for the preparation of the novel compounds of the invention, particularly by reaction of an alpha,beta-olefinic aldehyde with a normally liquid-to-solid primary aliphatic amine. Other objects of the invention will become apparent hereinafter.

It has been discovered that these and related objects of the invention may be accomplished by reacting under suitable conditions an alpha,beta-olefinic aldehyde with a normally liquid-to-solid primary aliphatic or primary cycloaliphatic monoamine containing at least three carbon atoms, or with a mixture of such amines, according to the apparent equation.

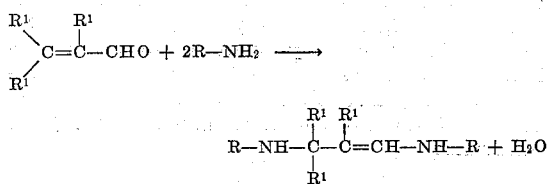

in which R represents an aliphatic radical containing at least three carbon atoms, and each $R^1$ represents either the hydrogen atom or an alkyl group. The reaction described in the foregoing equation may be effected by mixing the indicated reactants, under suitable conditions of reaction which are described in detail hereinafter, and maintaining the mixture under the conditions of the reaction for sufficient time for the reaction to take place. After completion of the reaction, the novel products may be recovered from the reaction mixture, or in certain cases they may be usefully applied in the relatively crude state as thus prepared without further purification.

The products that are formed by the process of the present invention and to which the invention relates, have structures that may be represented by the apparent formula:

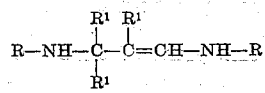

Formula I in which each R represents an open-chain aliphatic hydrocarbon group containing from three to eight carbon atoms, and each $R^1$ represents either the hydrogen atom or a lower alkyl group. It will be observed that the compounds defined by the above formula are distinctly different from the imines of the character of "Schiff's bases" which one normally would expect to be formed by the reaction of an aldehyde with a primary amine. Because of the probability that imines, containing the grouping (—N=C—), would have been formed by the reaction of an alpha,beta-olefinic aldehyde with the present primary aliphatic monoamines, in a manner similar to known reactions between certain saturated aldehydes and primary aliphatic amines, the formation of compounds having structures defined by the above formula was an entirely unexpected result of the process. The compounds defined by the above formula possess many unique and desirable properties. Their unique and desirable properties appear to be attributable in part to the presence of the two secondary amino nitrogen atoms in the molecule and in a further part to the particular configuration of the amino nitrogen atoms relative to the olefinic bond. Desirable and improved properties are also imparted to the above-defined compounds by the particular terminal aliphatic groups that are attached to the amino nitrogen atoms and by the groups that may be attached to the carbon atoms of the alkenylene residue to which both of the amino nitrogen atoms are attached.

In its broadest conception the invention is regarded as embracing the preparation of compounds having a structure corresponding to the foregoing structural formula from any of the aliphatic alpha,beta-monoolefinic aldehydes according to the process of the invention. The unsaturated aldehydes which may be employed in accordance with the generic aspects of the invention may be defined by the formula

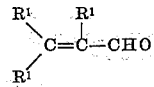

in which each $R^1$ represents either the hydrogen atom or an alkyl group, such as a methyl, ethyl, propyl, isopropyl, butyl, pentyl, hexyl, or higher straight-chain or branched-chain alkyl group. A preferred group of unsaturated aldehydes comprises those aldehydes in which each $R^1$ represents either the hydrogen atom or a lower alkyl group, although the invention is not to be construed as limited thereto in its broadest embodiments. Representative unsaturated aldehydes which may be employed in accordance with the process of the invention for the preparation of useful products of the herein described character include, among others the following: acrolein, methacrolein, crotonaldehyde, alpha-ethylacrolein, alpha-propylacrolein, alpha-isopropylacrolein, alpha butylacrolein, alpha-isobutylacrolein, alpha-t-butylacrolein, the alpha-pentylacroleins, alpha,beta-dimethylacrolein, alpha-methyl-beta-ethylacrolein, alpha-isopropyl-beta-ethylacrolein, beta-ethylacrolein, beta-isopropylacrolein, beta,-beta-dimethylacrolein, beta-ethyl-beta-propylacrolein, alpha,alpha,beta-triethylacrolein, and the like and their homologs and their analogs.

From the standpoint of their availability and their applicability in the process of the invention, and also in view of the particularly desirable characteristics of the resulting products, a most highly preferred group of unsaturated aldehydes that may be employed according to the process of the invention for the preparation of the herein described novel products comprises the alpha-methylene aliphatic aldehydes, i. e., those aliphatic unsaturated aldehydes which have structures corresponding to the formula

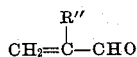

in which R'' represents either the hydrogen atom or an alkyl group, preferably a lower alkyl group. Acrolein, methacrolein, alpha-ethylacrolein, and the homologous aliphatic aldehydes which contain a methylene (CH$_2$=) group bonded to the carbon atom in the alpha position relative to the carbonyl carbon atom constitute this most highly preferred group.

In its broadest conception the present invention is regarded as generic to the preparation of compounds of the herein defined character by the reaction of an unsaturated aldehyde of the above-defined character with any normally liquid-to-solid primary aliphatic monoamine containing at least three carbon atoms. The amines which may be employed in the process of the invention thus may be defined by the formula

in which R represents an aliphatic hydrocarbon group containing at least three carbon atoms. Representative primary amines which thus may be employed include, among others, the following: the saturated primary amines, such as propylamine, isopropylamine, butylamine, isobutylamine, t-butylamine, 1-methylbutylamine, 1,2-dimethylbutylamine, 1,3-dimethylbutylamine, 1,3-diethylpentylamine, the octylamines, and higher saturated primary amines, such as tetradecylamine, hexadecylamine, octadecylamine, eicosylamine and the like; and the unsaturated primary amines, including allylamine, crotylamine, methallylamine, 2-propynylamine, butadienylamine, 3-butenylamine, isopropenylamine, and homologous and analogous unsaturated aliphatic primary amines.

In the execution of the process of the invention, the particular reactants that are employed will be determined by the unsaturated diamine of the herein defined class that it is desired to prepare. Within the generic class provided by the invention, there exist compounds and groups of compounds that are of particular value in certain applications by virtue of the character of the substituent groups that are attached to the respective amino nitrogen atoms and to the carbon atoms of the propenylene residue in the molecule. Groups of compounds which are embraced within the generic teachings of the invention and which have an outstandingly high degree of utility include in particular the following:

A. The N,N' - dialkyl-1-alkene - 1,3 - diamines which may be prepared by the reaction of acrolein or homologous alpha,beta-olefinically unsaturated aldehydes with saturated primary amines. This group includes among others, the following diamines:

N,N'-dipropyl-1,3-propenediamine
N-butyl-N'-propyl-2-methyl-1,3-propenediamine
N,N'-diisopropyl-1,3-propenediamine
N,N'-dibutyl-1,3-propenediamine
N-isopropyl-N'-butyl-1,3-propenediamine
N,N'-diisopropyl-1-butene-1,3-diamine
N,N'-diisopropyl-2-methyl-1-pentene - 1,3 - diamine
N-(1,3 - dimethylbutyl) -N'-pentyl-2-methyl-1,3-propenediamine
N,N'-diisopropyl-2-propyl-1,3-propenediamine
N,N'-dihexyl-2,3-dimethyl-1-butene-1,3-diamine
N,N'-dioctyl-1,3-propenediamine
N,N'-dioctyl-2,3-dimethyl-1-heptene-1,3-diamine
N,N'-diisobutyl-1-octene-1,3-diamine B. The more limited, preferred group composed of the N,N' - dialkyl-1,3-propenediamine and the N,N' - dialkyl-2-alkyl - 1,3 - propenediamines which may be prepared by the reaction of the alpha-methylene aliphatic aldehydes with saturated primary amines containing at least three carbon atoms. The members of this preferred group may be represented by the formula

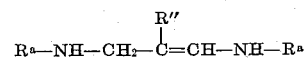

Formula II in which each R$^a$ represents a saturated hydrocarbon group containing at least three carbon atoms and the R'' represents either the hydrogen atom or an alkyl group.

C. The N,N'-bis(2-alkenyl)-1-alkene-1,3-diamines which may be prepared by the reaction of an aliphatic alpha,beta-olefinic aldehyde with a 2-alkenyl primary amine, preferred, more limited groups including in particular the N,N'-bis(2 - alkenyl) - 1,3 - propenediamines and the N,N'-bis(2-alkenyl) - 2 - alkyl - 1,3 - propenediamines. Representative N,N'-bis(2-alkenyl)-1-alkene-1,3-diamines include, among others, the following:

N,N'-diallyl-1,3-propenediamine
N,N'-dimethallyl-1,3-propenediamine
N,N'-diallyl-2-methyl-1,3-propenediamine
N,N'-dimethallyl-2-methyl-1,3-propenediamine
N,N'-dicrotyl-1,3-propenediamine
N,N'-dimethallyl-1-butene-1,3-diamine
N,N'-bis(2-methyl-2-butenyl) - 1,3 - propenediamine
N,N'-diallyl-2-methyl-3-ethyl-1-hexene-1,3 - diamine
N-allyl-N'-methallyl-2-ethyl-1,3-propenediamine
N,N'-bis(2-hexenyl)-2-methyl-1,3 - propenediamine The foregoing and related unsaturated diamines within the herein defined class may be prepared in accordance with the process of the invention by reacting the unsaturated aldehyde and the primary amine or a mixture of primary amines at a suitable reaction temperature under substantially anhydrous conditions and in relative proportions which favor the desired reaction. The reaction may be effected by mixing the unsaturated aldehyde with the free primary amine in suitable proportions in the absence of acid and under conditions of temperature which favor the desired reaction, and maintaining the mixture at the reaction temperature until the reaction is completed. It has been found that the use of relatively low temperatures and the presence of a substantial molar excess of the primary amine over the unsaturated aldehyde favor the formation of the desired products to the substantial exclusion of different products which may be result from the reaction of an unsaturated aldehyde with a primary amine. It is desired to employ such conditions of temperature and relative amounts of the reactants that the formation of products other than the desired products may be minimized. It has been found that this may be accomplished by effecting reaction at a temperature desirably not exceeding about $+20°$ C. and preferably within the range of from about $-30°$ C. to about $+20°$ C. It also has been found that the relative proportions of the unsaturated aldehyde and the primary amines may be controlled so as to favor the formation of the desired products of reaction with concomitant reduction or substantial exclusion of the formation of other, undesired products of reaction between the unsaturated aldehyde and the primary amine. This may be accomplished in accordance with the invention by employing the amine in amounts corresponding to a substantial molar excess over the unsaturated aldehyde.

It is desirable to employ amounts of the primary amine in excess of about 2 moles of the amine per mole of the unsaturated aldehyde, a preferred range comprising proportions of from about 3.5 to about 8 moles of the primary amine per mole of the unsaturated aldehyde. When the unsaturated aldehyde is a higher alpha,beta-unsaturated aldehyde, i. e., a homolog of methacrolein or crotonaldehyde, it is desirable to employ the relatively greater proportions of the primary amine, say amounts in excess of 3.5 to 4 moles per mole of the unsaturated aldehyde. Greater proportions of the amine are not necessarily detrimental to a successful execution of the process of the invention. However, the use of smaller proportions of the amine may lead to increased formation of products other than those desired in accordance with the invention, to the detriment and even to the substantial exclusion of formation of the desired products.

The desired reaction may be effected by mixing the two reactants under the above-stated conditions of temperature and proportions of reactants, and maintaining the mixture under the conditions of the reaction for sufficient time. When both of the reactants are normally liquid at the reaction temperature, the two reactants may be mixed in suitable proportions at the temperature of reaction and the mixture maintained within the stated range of temperatures until the reaction is completed. After the reaction is completed, the reaction mixture may be subjected to any suitable treatment leading to recovery and purification of the unsaturated diamine formed by the reaction, or in certain cases the unsaturated diamine may be usefully employed in the relatively crude state as thus directly obtained without further purification.

If desirable, the process of the invention may be executed in the presence of a suitable inert solvent medium, such as an inert organic solvent medium. For example, when one or both of the reactants is a solid at the reaction temperature, an amount of an inert organic solvent sufficient to mutually dissolve the reactants or to homogenize the reaction mixture may be included therein. The solvent either may be added separately to the reaction mixture, or either or both of the reactants may be employed in the form of a solution in the solvent. Suitable inert organic solvents which may be employed include the organic ethers, esters, saturated hydrocarbons, aromatic hydrocarbons, and the like. The formation of the present novel unsaturated diamines is favored by the substantial exclusion of water from the reaction mixture. In certain cases it is practicable to employ the commercial anhydrous grades of the reactants since these grades ordinarily contain only a very small amount of water, if any. Water is formed by the reaction which leads to the present unsaturated diamines. The amounts of water formed by the reaction are not necessarily harmful to the outcome of the process, and generally may be allowed to remain in the reaction mixture. However, the desired reaction frequently may be favored by the presence of a suitable desiccating agent which serves to remove water from the reaction mixture by either chemical or physical means. The desiccating agent should be one that does not react adversely with either the reactants or the desired product of the reaction. Non-acidic desiccating agents that are insoluble in the reaction mixture are eminently satisfactory for the purposes of the invention, representative examples thereof being anhydrous potassium carbonate, calcium oxide, magnesium oxide, anhydrous sodium sulfate, anhydrous sodium carbonate, anhydrous calcium sulfate, and the like. Drying agents relying on physical adsorption or absorption for their activity, e. g., activated alumina, also may be employed. The drying agent is a finely divided or other suitable form may be contacted with, preferably suspended in, the reaction mixture and the reaction effected in its presence. After completion of the reaction, the desiccating agent may be separated from the reaction mixture as by filtration, and the liquid portion of the mixture further purified by any suitable method of the character referred to above.

The process of the present invention may be executed in any effective manner and in any suitable type of apparatus. The process may be executed in either a batchwise, intermittent, or continuous manner. When the process is to be executed in a batchwise manner, one of the reactants, preferably the primary amine, and the desiccating agent if one is employed, may be placed in a reaction vessel provided with temperature regulating means, and the other reactant may be added thereto, preferably while the mixture is being agitated. After the addition of the second reactant, the reaction mixture may be maintained for an additional period of time at the reaction temperature, to allow the reaction to go further to completion, or in some cases it may be subjected directly to the purification treatment leading to recovery of the unsaturated diamine. Reaction times of from about ½ to about 12 hours ordinarily are entirely adequate. A preferred method of recovering the unsaturated diamine comprises subjecting the liquid portion of the reaction mixture to fractional distillation, preferably under reduced pressure, However, other methods of recovery may be employed, if desired, including but not being limited to, fractional crystallization, selective adsorption, treatments with selective solvents, and the like.

When a single primary amine is reacted with an unsaturated aldehyde of the herein defined class according to the process of the invention, the product that is obtained is an unsaturated diamine having a structure represented by Formula I when the groups represented by R are the same. The present invention also includes unsaturated diamines of the herein defined class in which the terminal groups represented by R in Formula I are different aliphatic groups, and the preparation of the same. According to this embodiment of the invention, the unsaturated aldehyde may be reacted with a mixture of primary amines to form an unsaturated diamine of the herein defined character in which the terminal groups attached to the amino nitrogen atoms differ from each other. When a mixture of primary amines is thus reacted with an alpha,-beta-olefinic aldehyde according to the process of the invention, there also are formed at the same time the respective unsaturated diamines resulting from the reaction of one molecule of the unsaturated aldehyde with two molecules of each of the respective primary amines. The individual unsaturated diamines thus formed may be separated from one another by suitable fractional distillation, or by other methods including, for example, low temperature crystallization, treatment with selective solvents, fractional crystallization of salts of the amine, or by equivalent known methods of separating mixtures of organic compounds.

An alternative method of preparing unsaturated diamines of the present class wherein the terminal groups represented by R differ from each other, includes the steps of reacting the alpha,beta-olefinic aldehyde with a single aliphatic primary amine to form a diamine in which the terminal groups represented by R are the same. The diamine thus prepared then may be reacted with an aliphatic primary monoamine under conditions which lead to interchange of the substituted amino group of the monoamine and one of the amino groups of the diamine according to the apparent equation

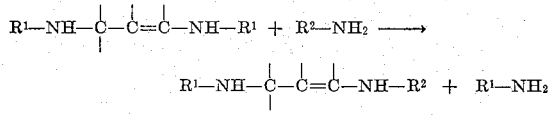

this method comprising in part the subject matter of the copending application Serial No. 759,472, filed July 7, 1947, now U. S. Patent No. 2,540,938.

The following examples will illustrate certain of the numerous possible specific embodiments of the invention. The examples are intended to illustrate the invention and not to limit the same as it is defined more broadly in the appended claims. In the examples, the parts are by weight.

Example I

Forty parts of finely divided anhydrous potassium carbonate were suspended in 224 parts of isopropylamine and the mixture was cooled to 5° C. to 10° C. Forty-two parts of acrolein were added to the mixture, at such a rate that the addition required 2 hours. During the addition of the acrolein, the mixture was agitated vigorously. After the addition of the acrolein was completed, the mixture was filtered to remove the potassium carbonate and the filtrate was distilled. After separation of unreacted acrolein and isopropylamine, there were separated 64 parts of N,N'-diisopropyl-1,3-propenediamine, distilling at 46° C. under pressure of 4 millimeters of mercury, and having a refractive index $(n_D^{20})$ of 1.4323 and a specific gravity (20/4) of 0.8003. Analyses: found, 69.2% C, 12.9% H, and 18.0% N; calculated for $C_9H_{20}N_2$, 69.2% C, 12.8% H, and 18.0% N.

Example II

Seventy parts of methacrolein were added slowly with agitation to 236 parts of isopropylamine cooled to 0° C. to 8° C. After the addition was complete, the mixture was fractionally distilled. There were recovered 130 parts of N,N'-diisopropyl-2-methyl-1,3-propenediamine distilling at 80.3° C. under a pressure of 20 millimeters of mercury, and having a refractive index $(n_D^{20})$ of 1.4282. Analyses: found, 70.73% C, 13.00% H, and 13.5% N; calculated for $C_{10}H_{22}N_2$, 70.53% C, 13.02% H, and 16.45% N.

Example III

One hundred twelve parts of acrolein were added gradually to 404 parts of 1,3-dimethylbutylamine in which were suspended 36 parts of anhydrous potassium hydroxide, according to the method of Example I. Upon filtration of the reaction mixture and distillation of the filtrate, there were recovered 191 parts of N,N'-bis(1,3-dimethylbutyl)-1,3-propenediamine. The diamine distilled at a temperature of 95° C. under a pressure of 0.5 millimeter of mercury and was found to have a specific gravity (20/4) of 0.8192. Analyses: found, 75.22% C, 13.09% H, and 11.4% N; calculated for $C_{15}H_{32}N_2$, 74.93% C, 13.42% H, and 11.65% N.

Example IV

N,N'-diisopropyl-1,3-propenediamine was prepared according to the method of Example I. A mixture of 77 parts of this diamine and 202 parts of 1,3-dimethylbutylamine was placed in a reaction vessel provided with a fractionating column arranged for reflux distillation with take-off of lower boiling components at the stillhead. The mixture was refluxed and isopropylamine was withdrawn from the stillhead as it accumulated. When liberation of isopropylamine ceased, the contents of the vessel were fractionally distilled under reduced pressure. There were recovered 54 parts of N-(1,3-dimethylbutyl)-N'-isopropyl-1,3-propenediamine distilling at 84° C. under a pressure of 4 millimeters of mercury.

An alternative method of preparing the N-(1,3-dimethylbutyl) - N' - isopropyl - 1,3 - propene - diamine would have been to react acrolein with a mixture, say of equimolar amounts, of 1,3-dimethylbutylamine and isopropylamine according to the process described herein. A mixture of N - (1,3 - dimethylbutyl) - N' - isopropyl - 1,3 - propenediamine, N,N' - bis(1,3 - dimethylbutyl) - 1,3 - propenediamine and N,N' - diisopropyl - 1,3-propenediamine would have been formed from which the desired asymmetrically N-substituted diamine could have been recovered by fractional distillation or other suitable methods.

The unsaturated diamines with which the present invention is concerned possess a wide field of utility due to the secondary character of the amino nitrogen atoms and because of the configuration of the amino nitrogen atoms and the olefinic linkage in the alkenylene residue of the molecule. The unsaturated diamines may be saturated with hydrogen to obtain saturated diamines in which the amino nitrogen atoms are secondary in character and which contain corresponding terminal aliphatic groups attached to the amino nitrogen atoms. Many of the saturated diamines which thus may be prepared could not have been prepared in a practicable manner according to synthetic methods heretofore known. The present unsaturated diamines may be converted in high yields to the corresponding saturated diamines by treatment with molecular hydrogen in the presence of an active hydrogenation catalyst such as a noble metal or a base metal hydrogenation catalyst. The hydrogenation may be effected either with the unsaturated diamine in the relatively less pure state in which it exists in the reaction mixture, or the unsaturated diamine may be separated from the reaction mixture and further purified to any desired extent prior to the hydrogenation.

Although their use as basic materials for the preparation of a wide variety of unsaturated diamines thus constitutes one application of the unsaturated diamines with which the present invention is concerned, their field of use is in no way so limited. The present novel compounds are highly valuable chemical intermediates. They may be converted to a wide variety of valuable compounds by reactions effected either at the olefinic bond of the alkenylene residue or at one or both of the secondary amino nitrogen atoms. Substances which may be prepared from the present unsaturated diamines include improved insecticides, pharmaceutical agents, and other biologically active compounds, and surface active materials. The present unsaturated diamines also appear to have a noteworthy value as reactants useful in the preparation of resins.

We claim as our invention:

1. A diamine having a structure defined by the formula

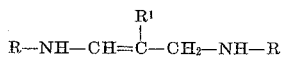

in which each R represents an open-chain aliphatic hydrocarbon group containing from 3 to 8 carbon atoms and $R^1$ is one of the class consisting of the hydrogen atom and lower alkyl.

2. N,N'-di(lower alkyl)-1-lower alkene-1,3-diamine, each of the amino nitrogen atoms being secondary amino nitrogen atoms.

3. As a new chemical compound, N,N'-diisopropyl-1,3-propenediamine.

4. As a new chemical compound, N,N'-bis 1,-3-dimethylbutyl)-1,3-propenediamine.

5. In a process for the preparation of amines, the step which comprises reacting in liquid phase one mole of a lower 2-alkenal with two moles of lower open-chain aliphatic hydrocarbon primary amine containing not less than 3 carbon atoms under substantially anhydrous conditions in the absence of acid at a temperature within the range of from about $-30°$ C. to about $+20°$ C.

6. In a process for the preparation of amines, the step which comprises reacting acrolein with isopropylamine present in an amount from about two to about eight moles per mole of the acrolein under substantially anhydrous conditions in the absence of acid at a temperature between about $-30°$ C. and about $+20°$ C. to produce N,N'-diisopropyl-1,3-propenediamine.

7. In a process for the preparation of amines, the step which comprises reacting acrolein with 1,3-dimethylbutylamine present in an amount from about two to about eight moles per mole of the acrolein under subtstantially anhydrous conditions in the absence of acid at a temperature between about $-30°$ C. and about $+20°$ C. to produce N,N'-bis (1,3-dimethylbutyl)-1,3-propenediamine.

HARRY DE V. FINCH.
ELBERT A. PETERSON.

REFERENCES CITED

The following references are of record in the file of this patent:

UNITED STATES PATENTS

| Number | Name | Date |
| --- | --- | --- |
| 2,045,574 | Adkins | June 30, 1936 |
| 2,415,020 | Morey | Jan. 28, 1947 |

FOREIGN PATENTS

| Number | Country | Date |
| --- | --- | --- |
| 323,512 | Great Britain | Jan. 3, 1930 |

OTHER REFERENCES

Braun; "Ber. deut. chem.," vol. 55, pages 3536-3559 (1922).

Mannich et al.: "Ber. deut. chem.," vol. 69, pages 2112-2123 (1936).